E. CARRAU.
SICKLE BAR ATTACHMENT FOR MOWING MACHINES.
APPLICATION FILED FEB. 7, 1920.
1,354,242.
Patented Sept. 28, 1920.
2 SHEETS—SHEET 1.
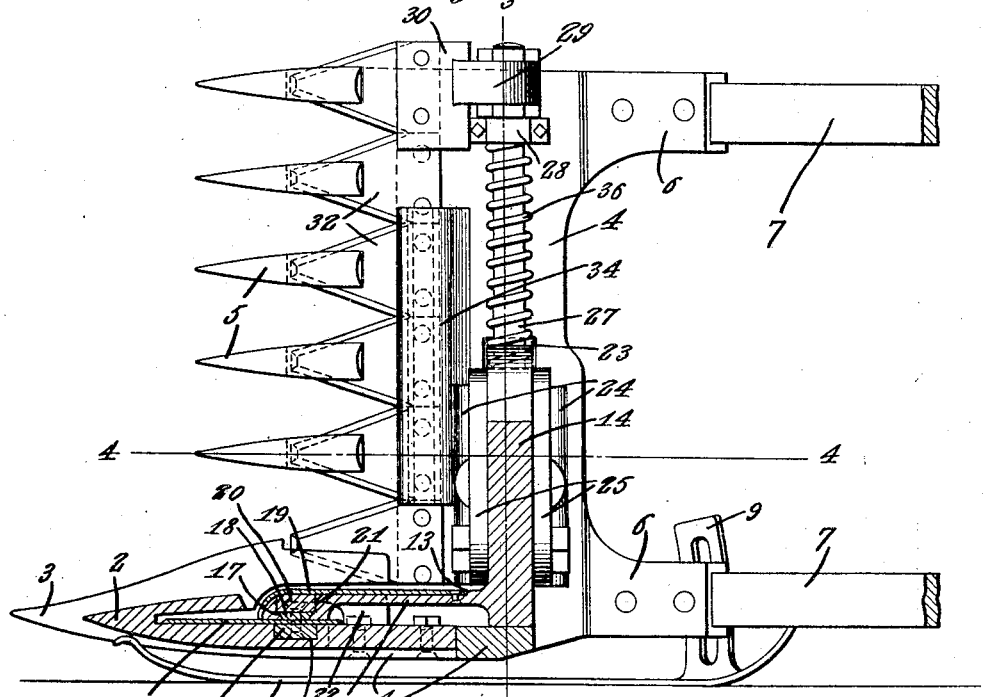
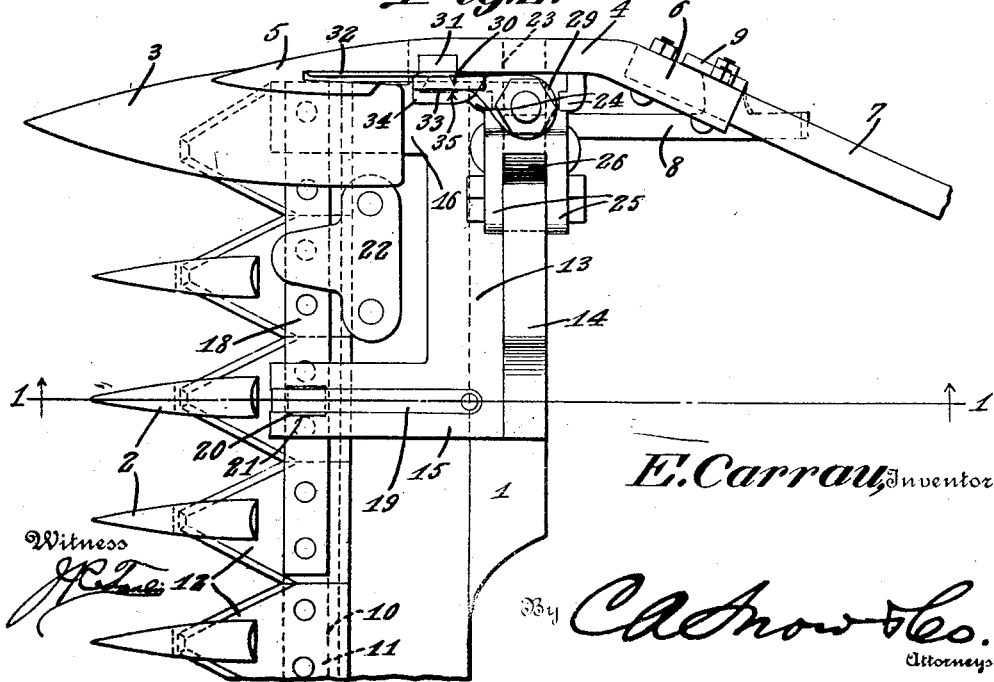
E. Carrau, Inventor
By C. A. Snow & Co.
Attorneys

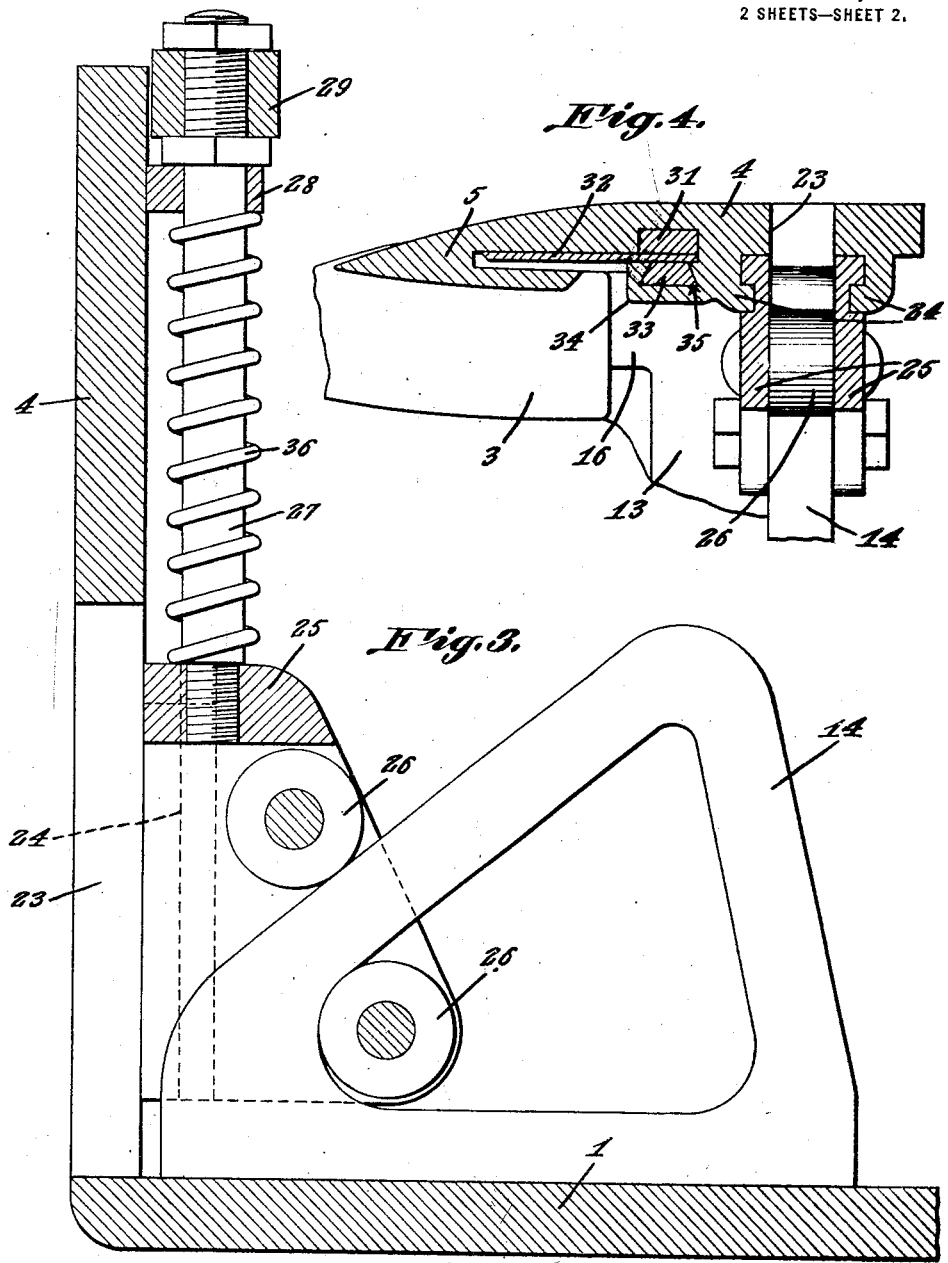

UNITED STATES PATENT OFFICE.

EDWARD CARRAU, OF MOXEE CITY, WASHINGTON.

SICKLE-BAR ATTACHMENT FOR MOWING-MACHINES.

1,354,242.  Specification of Letters Patent.  Patented Sept. 28, 1920.

Application filed February 7, 1920. Serial No. 356,885.

*To all of whom it may concern:*

Be it known that I, EDWARD CARRAU, a citizen of the United States, residing at Moxee City, in the county of Yakima and State of Washington, have invented a new and useful Sickle-Bar Attachment for Mowing-Machines, of which the following is a specification.

This invention relates to sickle bar attachments for mowing machines and is designed more especially as an improvement upon the structure disclosed in Patent Number 1,179,401 issued to me on April 18, 1916.

One of the objects of the invention is to render the structure more accurate in operation, reduce the power required to drive the attachment, and to insure proper coöperation of the guards and sickle bar so as to insure the cutting of the material supplied thereto. A further object is to provide means whereby the blades can be readily ground or sharpened, it being possible to remove them readily from the machine.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a vertical section through the sickle bar and showing the vertical cutting mechanism in elevation, said section being taken on the line 1—1, Fig. 2.

Fig. 2 is a plan view of the structure shown in Fig. 1.

Fig. 3 is a section on line 3—3, Fig. 1.

Fig. 4 is a section on line 4—4, Fig. 1.

Referring to the figures by characters of reference 1 designates a finger bar of the ordinary type from which extends the guard fingers 2 and the end shoe 3, this shoe being formed with a side standard 4 and forwardly projecting guard fingers 5 which are disposed in vertical alinement. Wings 6 extend rearwardly and obliquely from the standard and carry fingers 7. Arranged under the shoe 3 is a runner 8 mounted for angular adjustment and having a slotted wing 9 upstanding therefrom and which is adjustably connected to one of the wings 6.

The finger bar 1 is formed with a longitudinal groove 10 and in this groove is slidably mounted a sickle bar 11 to which are attached the blades 12 of the sickle and which blades work within the guard fingers 2 as shown. A base member 13 is mounted to slide upon the finger bar 1 and is provided, at its back edge, with an upstanding triangular cam 14. Forwardly extending arms 15 and 16 are formed integral with the base member 13 and extend over the sickle bar 11 and the blades 12. Each of these arms is provided, at its lower face, with a dove-tailed groove 17 for the reception of a dove-tailed strip 18 which is secured longitudinally along the sickle bar 11 and above the blades 12, as shown. Thus the sickle bar is held in its proper course during reciprocation and is also held down firmly upon the finger bar. For the purpose of detachably connecting the base 13 to the sickle bar so that they will reciprocate together, a spring 19 is secured to the arm 15 and has a block 20 at one end thereof constituting a latch and which block projects down into an opening 21 and engages a notch in the strip 18. A retaining plate 22 is secured to the sickle bar 11 and extends over the finger bar 1 to further act as a holding means.

Formed within the standard 4 is a longitudinal slot 23 and the cam 14 is adapted to work within this slot, as will be obvious by referring to Fig. 3. Formed on the surface at the sides of this slot are guides 24 and mounted for vertical reciprocation in the guides is a block 25 carrying superposed rollers 26 between which works the inclined portion of the cam 14 as shown in Fig. 3. A rod 27 is detachably secured to and extends upwardly from the block and works within a guide ear 28 extending laterally from the standard 4. To the upper end of this rod is detachably secured an ear 29 extending from a plate 30 which is secured to the upper end of a sickle bar 31 which is mounted for reciprocation on the standard 4 and has blades 32 secured thereto. These blades coöperate with the fingers 5 for shearing along a vertical line. Secured to the sickle bar is a guide bar 33 having beveled sides and this guide bar works within a guide flange 34 which is formed integral with the standard and is provided with a dove-tailed groove 35 for the reception of the bar 33. A spring 36 is mounted on the rod 27 and bears at its upper end against the guide ear 28 and at its lower end against the block 25 so as to hold said block normally pressed downwardly.

It will be obvious that when the sickle bar 11 is reciprocated it will carry therewith the base plate 13 and the cam 14 and said cam will work back and forth within the slot 23 and between the rollers 26 so as to cause an up and down reciprocation of the rod 27 and of the vertical sickle bar 31. By assembling the various parts in the manner disclosed all lost motion is eliminated, undesirable spacing of the coöperating cutting elements is prevented, and, by detaching the rod 27 from the ear 29 the sickle bar 31 can be elevated readily with its blades 32 so as to enable the parts to be sharpened readily. By disengaging the block 20 from the horizontal guide strip 18 the sickle bar 11 can be reciprocated independently of the vertical sickle bar.

What is claimed is:

1. The combination with a horizontal finger bar, a sickle bar mounted for reciprocation thereon, a shoe at one end of the finger bar, a standard upstanding from the shoe, guard fingers extending forwardly from the standard, of an upstanding sickle bar mounted for reciprocation on the standard, a cam movable with the horizontal sickle bar, a member movably engaged and actuated by the cam, vertical guides for said member, yielding means engaging the member for holding it normally depressed against the cam, and a detachable connection between said member and the vertical sickle bar.

2. The combination with a horizontal finger bar, a sickle bar mounted to reciprocate thereon, a shoe at one end of the finger bar and a slotted standard upstanding from the shoe, of a cam mounted to reciprocate with the said sickle bar and within the slotted standard, guides upon said standard, a block mounted for reciprocation within the guides, means for transmitting motion to the block from the cam, a sickle bar mounted for reciprocation on the standard, a detachable connection between the sickle bar and the block, and yielding means engaging the block for holding the same normally depressed relative to the cam.

In testimony that I claim the foregoing as my own, I have hereto affixed my signature in the presence of two witnesses.

EDWARD CARRAU.

Witnesses:
 FRANCOIS DUBOIS,
 NORRIS LITCH.